Fig. 2. Addition

March 22, 1932.  J. W. BRYCE  1,850,577
COMPUTING MACHINE
Filed Dec. 12, 1927   7 Sheets-Sheet 6

March 22, 1932.  J. W. BRYCE  1,850,577
COMPUTING MACHINE
Filed Dec. 12, 1927    7 Sheets-Sheet 7

Inventor
J. W. Bryce
By his Attorneys
Cooper, Kerr & Dunham

Patented Mar. 22, 1932

1,850,577

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

COMPUTING MACHINE

Application filed December 12, 1927. Serial No. 239,309.

This invention relates to improvements in computing machines and more particularly relates to and has for its object the provision of a machine in which the numerical terms of a to be performed computation may be entered and in which by the operation of the machine, the said terms may be merged into a new or computed result, which result can then be given out or otherwise displayed by the machine.

Inasmuch as the machine is adapted for various kinds of computations such as addition, subtraction, multiplication, division and the like, the phrase "numerical terms" is to be considered as broadly defining one or the other or both of the values which are to be entered into the machine and which terms merge together by the operation of the machine to give a new computed result.

The term "merging into a new result" is to be considered as broadly defining any sort of computative operation, such as addition, multiplication, subtraction, division or the like, or various other sorts of computations which involve a merging of a plurality of numerical terms which are entered into the machine. Thus the present machine is adapted to receive two terms of an equation, then to solve the equation and give forth the result or the third term of the equation.

The machine includes means for merging the numerical terms to form the ultimate or computed result. In arriving at such ultimate result the terms are both merged and converted or translated from their original digital form into combinational representations which may be coordinated to the components of an ultimate result if such ultimate result is in multi-denominational form. From such combinational representations the ultimate result is directly derived so as to finally show the numerical answer.

In carrying out the foregoing merging step, the machine sets up combinational representations of the result or of components of the result upon combinational set-up devices. This operation is in contra-distinction to the merging of results and the setting of the same upon digital set-up devices which have heretofore been employed in machines which effected no conversion or translation. Typical machines of this type are those shown in my prior Patent No. 1,622,279 patented March 29, 1927.

By effecting conversion or translation and in employing combinational set-up devices, a much less complicated and involved mechanism is secured than has previously been secured in machines of this general class. By utilizing for example, four elements or pairs of contacts which are set up in a combinational way, or four circuits which are controlled in a combinational manner, at least ten digits may be represented thereby. Such set-up may be effected by utilizing or setting each of the elements of the four or of four circuits singly and various of two elements or circuits of the four set up and controlled in a combinational manner.

Heretofore, for example with the construction of my prior patented machine above referred to which employed digital set-up devices, at least ten elements or pairs of contacts with ten corresponding circuits would be required to set up and show the desired corresponding result.

The machine includes a plurality of set-up devices which are capable of being set up to represent a complete numerical table. This numerical table may be one of addition, subtraction, multiplication or division.

Provision is also made for setting up a representation of the negative character of a result if such result is negative in a subtracting operation.

Provision is furthermore made for setting up a representation of a remainder if such remainder exists after carrying out a dividing operation.

For simplicity and in order to avoid a multiplicity of parts, provision is made for setting up the numerical result terms by combinational representations of each of the terms. Such various set-ups and representation of the table is effected under the control of and by the entering of one of the terms of the computation into the machine. The entry of the other term effects a selection of the set-up devices which selection controls the giving forth of the ultimate result. The numerical terms of the to be performed computation may be entered in either order, i. e., the selection may be made first and the table values formed subsequently or vice versa, or if desired, both terms can be entered simultaneously.

Broadly, the present invention has for its general objects the provision of a computing machine of simplified form which is adapted to handle various sorts of computations such as heretofore set forth and more particularly, the invention is directed to and has for its objects the provision of a machine which is adapted to secure the desired results with fewer cooperating parts than heretofore.

Other objects and advantages of the present machine will be hereinafter set forth in the accompanying specifications and claims and shown in the drawings, which by way of illustration show a simple diagrammatic representation of a preferred embodiment of my invention.

The disclosure of the present application is intended to show only the elemental basic operative principles of my new computing machine. This is done in order that such underlying principles may be clearly understood independently and by themselves and without the possible confusion incident to the disclosure of such principles in a more elaborate mechanism.

Before describing the detailed operation of the machine it may be stated that the machine herein illustrated and described embodies a mechanism which is capable of having entered therein two numerical terms of a to be performed computation and to show the result of the merger of the terms. It is obvious that the machine could be further expanded to handle problems involving a greater number of terms than two, and in my copending application, Serial No. 244,594 filed January 5, 1928 such a machine is fully illustrated and described. The present application shows the elemental principles which are employed.

The disclosure of this application shows a mechanism which is capable of carrying out the underlying operations of a machine of this class. For a clearer understanding of the fundamental invention, it may be stated that the machine comprises two entering devices each capable of being set to represent the digits from 1 to 9 and 0. There is furthermore provided a selecting device which adapts one of the entering means for computing or merging operations of various sorts, such as division, multiplication, addition and subtraction.

Provision is made for showing the result as a printed record. However the invention is not limited to showing the result in this way. The result displaying means is so arranged as to show a multi-denominational result, for example, if 3 is to be added to 9 the result would be 12. Accordingly, the recording mechanism has two sets of type for showing the multi-denominational result. These same types are also adapted for showing the results in multiplying operations, for example, if the 9 and 3 were entered into the machine and the machine set for multiplication 27 would be shown by the type.

In dividing operations, the recording mechanism shows not only the full number result of the division, but also the remainder. In showing the remainder, the remainder is shown as a simple number and in reading the result such remainder is interpreted in the following manner. If the machine is intended to divide 9 by 2, the result would be shown as 4−1, meaning a whole number of 4 with a remainder of 1 or ½ since 2 is the divisor.

In subtracting operations the recording mechanism utilizes one of its type wheels to show a minus sign before the result if the result is negative. For example, if 6 be taken from 5, the machine would show the result as minus 1.

Furthermore, before describing the detailed parts of the machine it may be well to set forth that in effecting the various computations, the machine proceeds by first forming all possible computations of a given entered term by all of the possible digits which may be merged therewith. Thereafter or previously or concurrently, a selection is made of the particular result which is formed by the result forming means. Take for example, the two terms 9 plus 3 and assume the machine set for addition. The entry of the 3 term into the machine immediately sets up in the machine representations of 3 plus 0 equals 3, 3 plus 1 equals 4, 3 plus 2 equals 5, 3 plus 3 equals 6, 3 plus 4 equals 7, 3 plus 5 equals 8, 3 plus 6 equals 9, 3 plus 7 equals 10, 3 plus 8 equals 11, 3 plus 9 equals 12. The operation of one term entering mechanism thus first effects a representation of all possible results which could be secured in the particular computation being performed for the particular digit of the first term taken with and merged with each of the other digits which might be represented by the other term entering means. It is then by and upon the entry of the other term into the machine that a selection is made of the particular result which is definitely coordinated to the second entered term. All other results not coordinated to the value of the second term are discarded by this term entering selecting operation.

In the above example, a machine having set up a representation of 9 plus 3 equals 12, the entry of the second term 9 would select the answer 12 from all of the other answers or results and control the operation of the machine thereby.

Similar principles are employed for division, subtraction and multiplication. The results set up are in each case coordinated to the particular kind of a computation which the machine is intended to perform.

It may be further explained that due to the fact that the result may be a multi-denominational one, provision is made for concurrently setting up the component parts of a result if such result is of multi-denominational character. For example, if 9 and 3 are to be added, the machine sets up a representation of 1 and also the representation of 2 which taken together form the complete answer of 12.

To effect the representation of result terms and to avoid the multiplicity of parts, heretofore necessary, provision is made for representing the various results by combinational representations thereof as previously explained. A plurality of sets of combinational set up devices or more broadly combinational result retaining means or potential combinational circuit controlling means are provided for representing all of the result digital characters from 1 to 9 and 0 and for also representing a minus symbol. The combinational devices are adapted to give forth both components of the result if it is a multi-denominational one.

It will be hereafter noted that two zero entering means are provided and obviously, if the machine be set to divide a whole number by zero the result would actually be infinity. While the machine could be arranged to print a symbol representing infinity such extra recording symbol is not here shown or employed because infinity is not a term which is usually employed in commercial transactions and I accordingly arrange the machine to print a zero when such irregular transactions are performed upon the machine.

In the drawings

Figs. 1 and 1a taken together represent the electrical control devices for giving forth the result.

Figs. 5 and 5a are the similar parts which are used for controlling in dividing operations. In these figures the right hand component controlling parts are shown in Fig. 5 and the remainders are represented by the parts in Fig. 5a.

Figure 1:
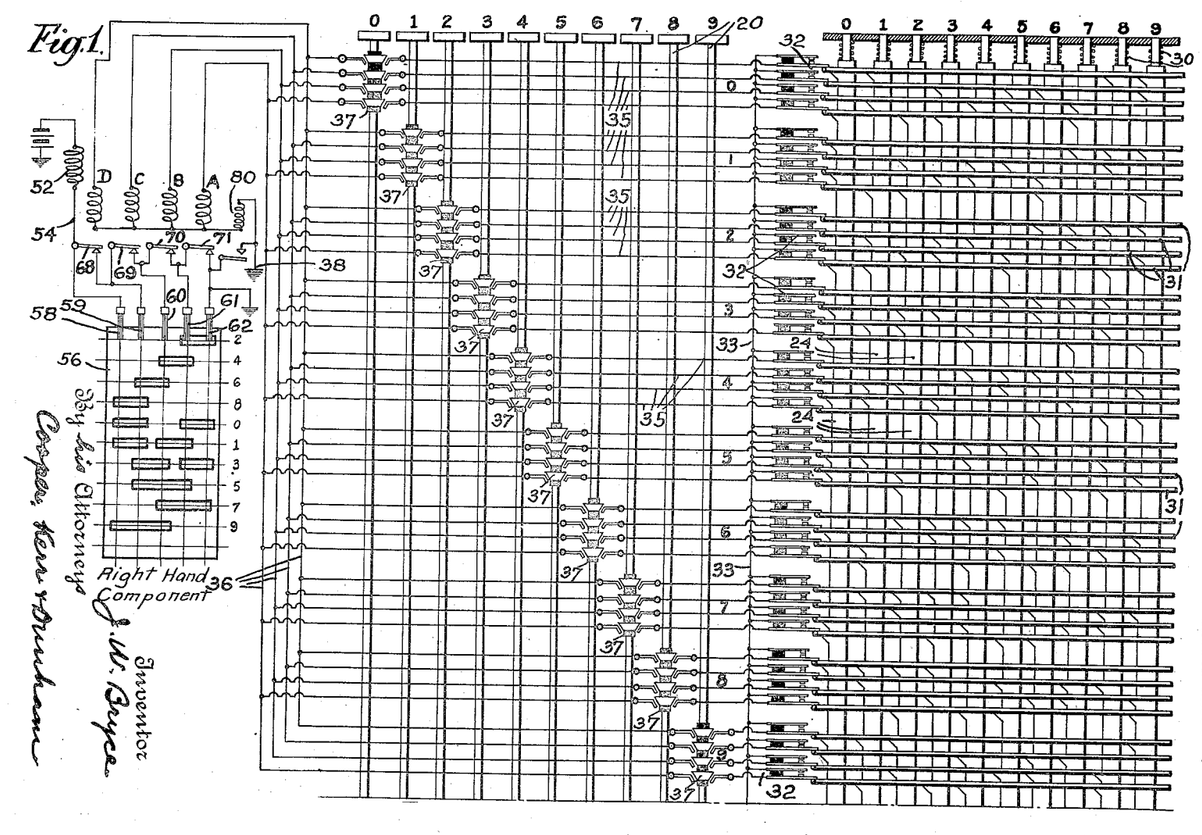

Referring now to Figs. 1 and 1a the machine comprises two sets of term entering means, one set designated 20 comprising a series of vertically depressible keys which are adapted to be depressed and which carry key buttons suitably inscribed with the numeral representing value of the key. For convenience the numerals are shown above the corresponding key buttons in Fig. 1. When depressed, any key is held in depressed position by an impositive lock such as indicated at 21 (Fig. 1a). After operation the key may be lifted to be restored by hand to its normal position. No key restoring or unlatching devices are herein shown, as these can be of any form well known in the art. The entering elements 20 are shown as having lengthy key shanks as a matter of convenience of illustration only.

The other setting elements designated 23 are those for entering the other term of the to be preformed computation. These entering elements have usual numbered buttons as shown in Fig. 1a and these buttons are suitably attached to the slidable bars 24. Each bar is furthermore provided with a small pinion 25 which meshes with the rack 26 which is settable by a selecting device generally designated 27. This selecting device 27 selects the type of computation which is to be performed by the machine. In Fig. 1a the selecting device is set for addition.

It will be understood that the bars 24 are both rotatable and vertically slidable. They are slidable in the direction of their length. This action is secured by pressing upwardly on the button on the bar which raises the bar against the tension of a spring 30 shown in Fig. 1. The selecting device 27 rotates or turns the bar 24 and by this action one of the four faces of the bar is presented to coact with a series of bails, one of which is shown at 31 in Fig. 7. Such bails are also diagramatically indicated in Figs. 1 and 1a with a corresponding reference numeral. The bars 24 are provided with controlling lugs or teeth on the various faces, as clearly shown in Figs. 7 and 8.

For convenience in the subsequent description of the controlling lugs or teeth, those employed for division carry a reference character $v$. All for addition employ a reference character $t$. All for substraction employ a reference character $s$ and all for multiplication employ a reference character $m$.

Figures 6, 7, 8, 9:
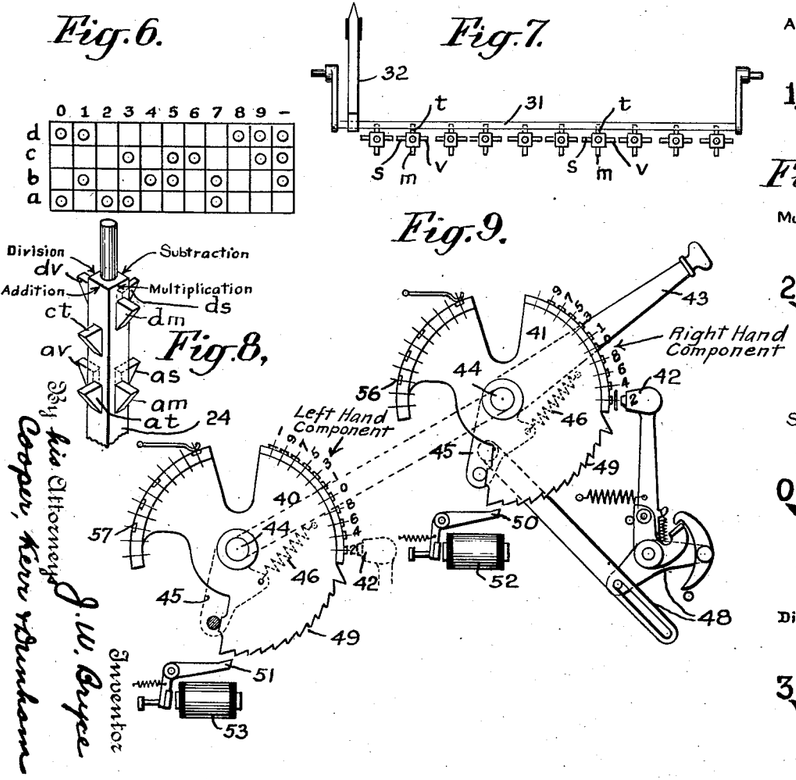
Fig. 6 shows the code which is used in the machine in the combinational set-up devices therein.
Fig. 7 is a detail view showing the manner of operating the contacts by a transverse bail from a selected one of the term entering means.
Fig. 8 is a detail view in perspective showing one of the setting elements for setting the contacts through the instrumentality of a bail, one of which is illustrated in Fig. 7.
Fig. 9 shows the printing mechanism for printing the result and also shows the controlling computer and electro-magnetic control mechanism therefor.

Now referring to Fig. 6, the code which is employed for representing the various digits, 0 and other symbols is here shown. In the code, the various digits and 0 are represented in a combinational manner, thus 0 is represented by the combination of $a$ and $d$, 1 is represented by the combination of $b$ and $d$, 6 is represented by $c$ taken alone. Thus all of the digits and 0 are represented by combinational representations of not over two elements or positions taken from a total of four elements or positions. All of the single positions or elements are utilized and various combinations of two elements or positions of the four are used. To represent the minus sign, three elements or positions are used in combination, viz. $b$, $c$ and $d$. It is by the use of the combinational representations that the number of elements in the machine is greatly reduced. By employing the foregoing combinations selected from various of four elements in a combinational manner, means is provided to represent all of the digits, the 0 and the minus sign.

Referring again to Fig. 8, it will be noted that the various controlling lugs $v$, $t$, $m$ and $s$ are each provided with their reference characters $a$, $b$, $c$ and $d$. These symbols represent the combination position or element for any given digit. Thus taking the division lugs on the bar 24 in Fig. 8, it will be seen that there are two of these lugs $dv$ and $av$. Referring to the table $ad$ is representative of 0.

The addition lugs shown in Fig. 8 are designated $at$ and $ct$. Again referring to the table $ac$ is representative of a result of 3. The multiplication lugs $am$, $dm$ correspondingly represent a result of 0 ($ad$ representing 0) and the subtraction lugs $as$ and $ds$ similarly represent 0.

Referring now to the diagrams Figs. 1, 1a, 2 and 2a, it will be noted that in Figs. 1 and 1a no controlling lugs are shown on the bars 24 except the $t$ lugs which are those used for addition. The other $v$, $m$ and $s$ lugs are not shown on the bars in these two figures in order to avoid confusion in the drawings, but in practice it will be understood that such other lugs are actually provided on these bars.

Figure 2:
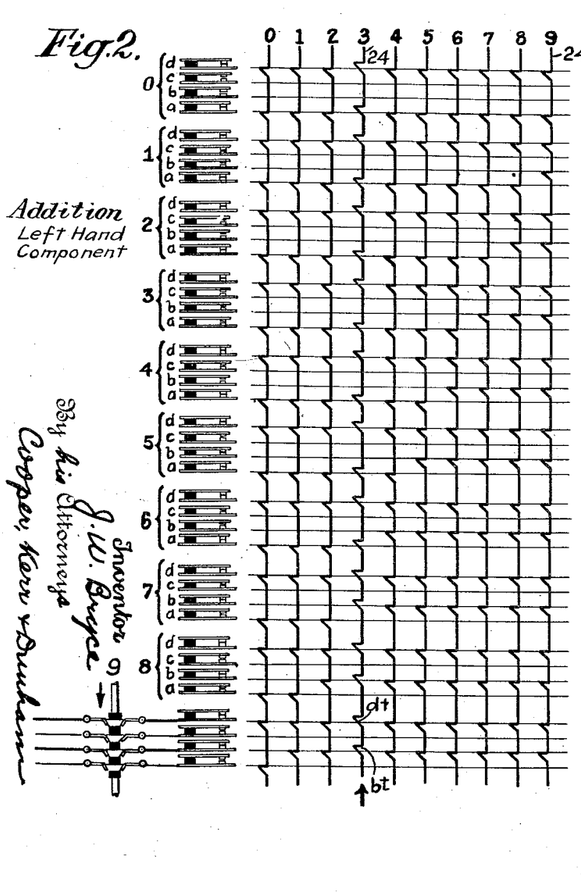
Figs. 2 and 2a are enlarged diagrammatic views of the controlling parts which are used in effecting operations of addition. These Figures 2 and 2a respectively represent the devices for forming the left and right hand components of the result, Fig. 2 showing those for the left hand components and Fig. 2a the right hand components.
Figure 2A:
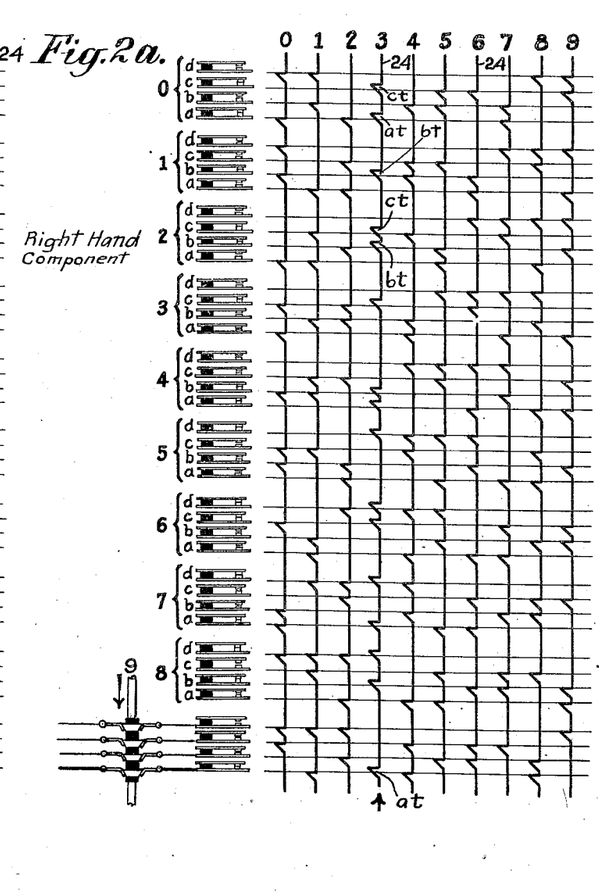

Referring now to Figs. 2 and 2a, these figures show the various bars 24 merely as solid lines and in these particular figures the number 3 term bar is pressed upwardly or raised as indicated by the arrow. All of the various term bars 24 are provided with lugs corresponding to the results which would be secured by adding the digital value of the bar to any of the nine possible digits and 0. Thus with the 3 bar which is shown as raised, this bar is shown provided with lugs to represent all of the possible results which would be secured by adding any of the nine possible digits and 0 to 3 which is the value of the term bar which is in raised or operative position.

Starting with Fig. 2a, which it is to be remembered represents the right hand component of the results for addition, this figure shows the bar 24 representative of the numeral term of 3 raised. Now noting this bar, it will be seen that the first two lugs on this bar from the top are those designated $ct$ and $at$. These lugs represent the result of the addition of the digit 3 to 0 or 3. The zero term of this computation is shown to the left of the diagram just beyond the contacts which carry the letters $a$, $b$, $c$ and $d$. Following further down on the bar the next lug shown for the next group is the lug $bt$. Again referring to the code, $b$ is indicative or representative of the digit 4, which is the result of adding 3 to 1. Next lower down on the bar are the lugs $ct$ and $bt$. $cb$ on the code is representative of 5 which is the result of adding 3 and 2. Similar lugs are provided along this bar and represent in order the sums of 3 and 3 or 6, and 3 and 4 or 7, and 3 and 5 or 8, and 3 and 6 or 9, and 3 and 7 or 10, and 3 and 8 or 11, and 3 and 9 or 12.

It will be noted that when the 7 position is reached and 3 is added thereto that the result of the addition cannot be shown with one digit. This accounts for the further extension of the bar which is represented in Fig. 2. Still considering the number 3 term bar of Fig. 2a and noting the lugs with reference to the numeral 9 at the left, it will be noted that the bar has a lug $at$ which is raised opposite the 9 to the left. $a$ on the code represents 2 which is the right hand component of the result of adding 3 to 9 or 12.

Now referring to Fig. 2, it will be noted that the same 3 bar in a position opposite the left hand number of 9 is shown as provided with two lugs *b* and *d* which are in raised position.

Again referring to the code *bd* represents 1 in the tens place or the so-called left hand component of the result. Thus the setting of the single term bar representative of 3 is adapted to give a resultant lug setting which is indicative of 12 as is shown in the larger detailed diagram Fig. 10, considering the set of contact devices, etc. which refer to an addition transaction.

Figures 3, 3A:
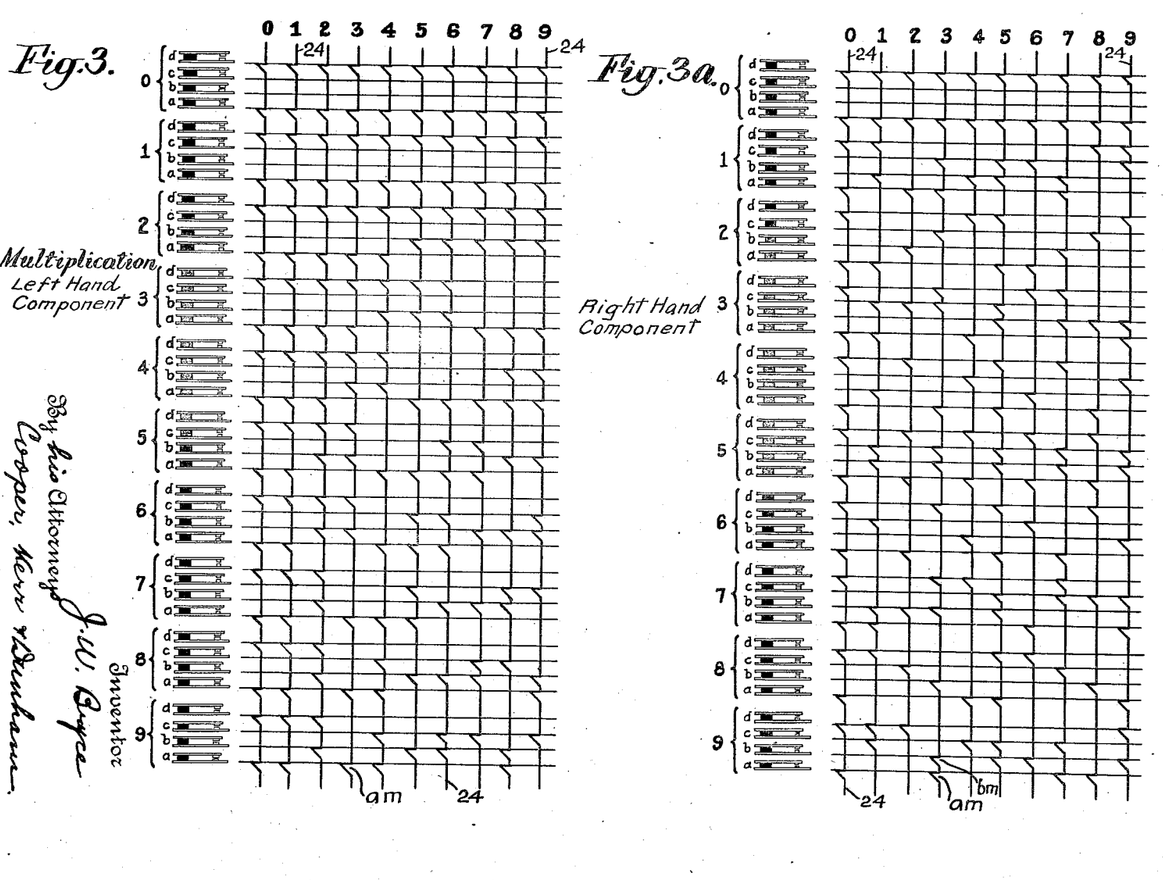
Figs. 3 and 3a represent corresponding parts to those shown in Figs. 2 and 2a which are used for giving out the left and right hand components in multiplying operations. The settable means shown in these figures are the same parts as those shown in Figs. 2 and 2a but are provided with certain controlling lugs for controlling multiplying operations.

The arrangement of the lugs on all of the bars 24 which are employed for multiplication, substraction and division is made in a similar manner to that outlined above for addition. In each case the lugs on the bars represent the result of the particular kind of computation and in a combinational manner. Taking Figs. 3 and 3a for example, if the bar representative of 3 be raised in these figures, it will be noted that opposite the symbol 9 to the left in Fig. 3a there are two lugs *am* and *bm*. This is representative of 7, the right hand component of the result of multiplying 9 by 3. In Fig. 3 the same bar representative of the numeral 3, opposite the 9 position, has one lug marked *am* which is a combinational representation of the numeral 2 or the left hand component of the result of the multiplication of 9 by 3 or 27. This is also represented in Fig. 10 in the multiplication diagram.

Figure 4:
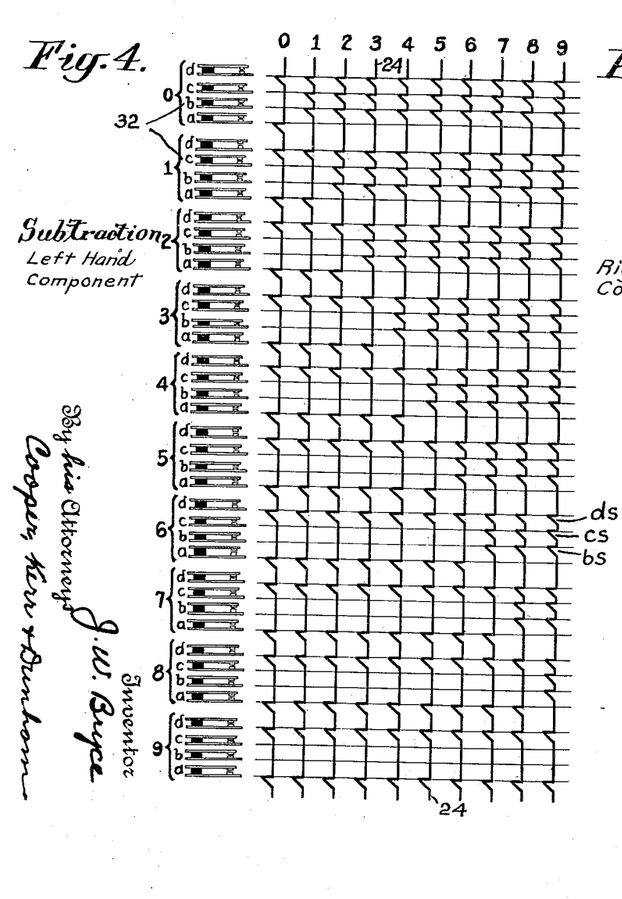
Figs. 4 and 4a represent the controlling parts which are effective in giving left and right hand components in subtracting operations.
Figure 4A:
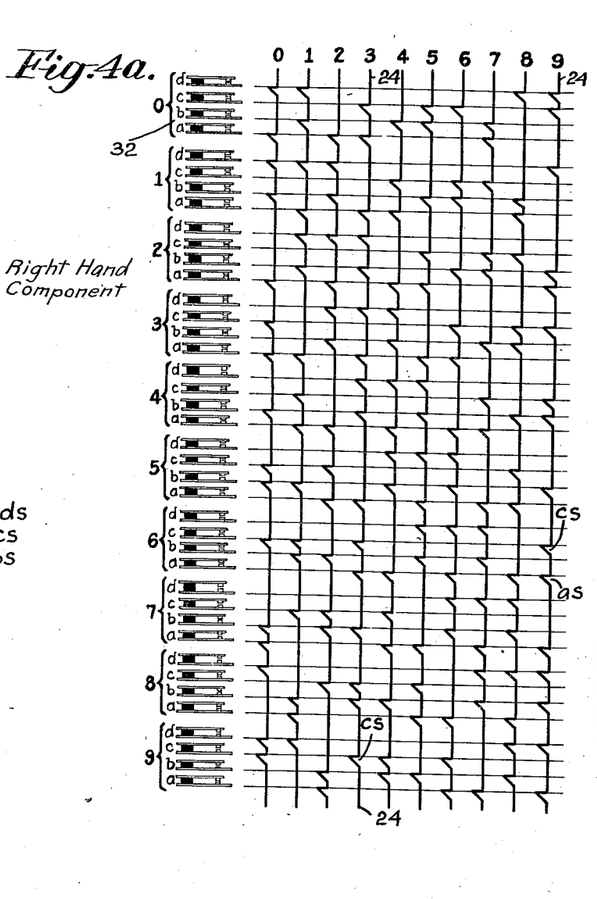

For substraction we refer to Figs. 4 and 4a. The bar 24 representative of numeral 3 in Fig. 4a and opposite the 9 position has a lug thereon *cs* which is representative of the numeral 6 or the result of subtracting 3 from 9. On the subtracting bars, a further factor has to be taken into account and that is to indicate the negative character of the subtrahend when a larger number is subtracted from a smaller number. Suppose for example, 9 is to be subtracted from 6, the result of this computation would be minus 3. Consider now the term bar representative of 9 and with reference to the symbol 6 to the left, this particular bar has on it lugs *as* and *cs* in Fig. 4a which is representative of 3 or the right hand component of the result. However, this 3 is a minus quantity and such minus character of the result is represented by the three lugs *bs*, *cs* and *ds* shown in Fig. 4. *b*, *c* and *d* on referring to the code, Fig. 6, are seen to be a combinational representation of minus.

Figure 10:
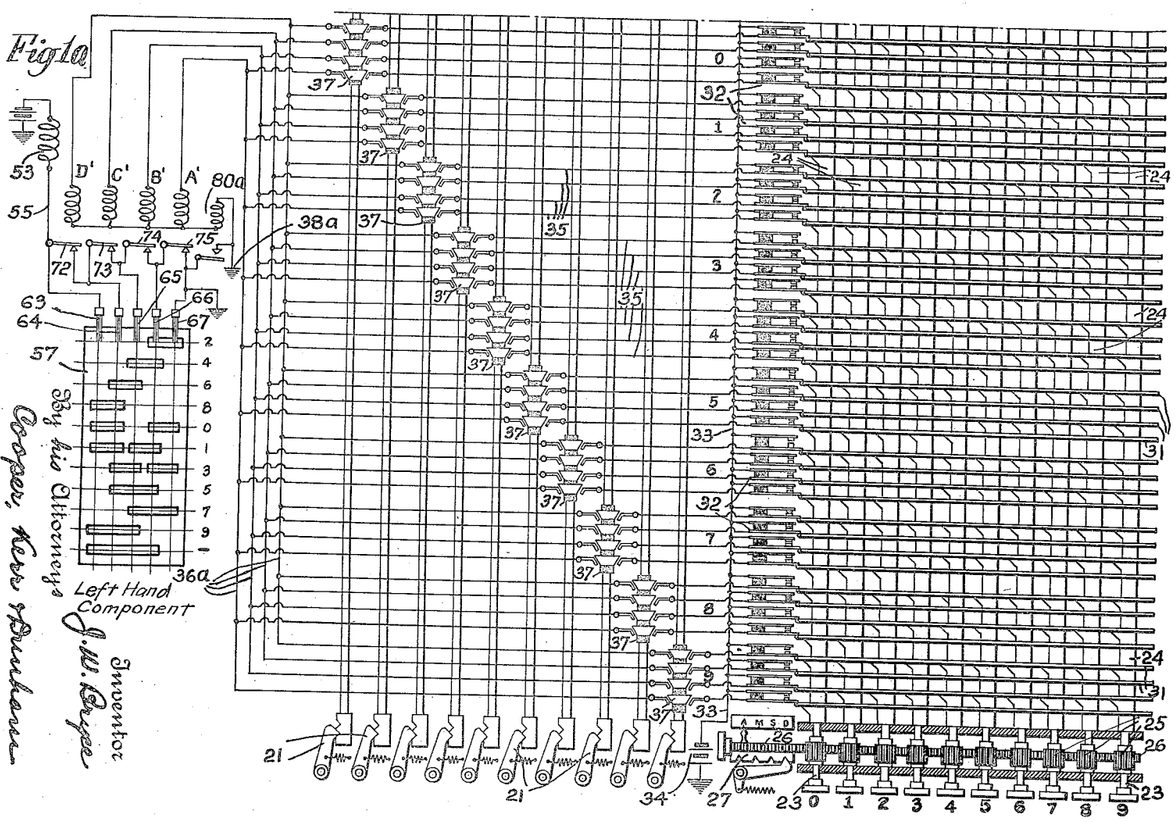
Fig. 10 is a series of views showing the combination contact action for certain specific examples of addition, multiplication, subtraction and division.

Fig. 10 shows the action in a subtracting operation and the combinational settings from which the representative result of 6 is obtained in subtracting 3 from 9.

Figure 5:
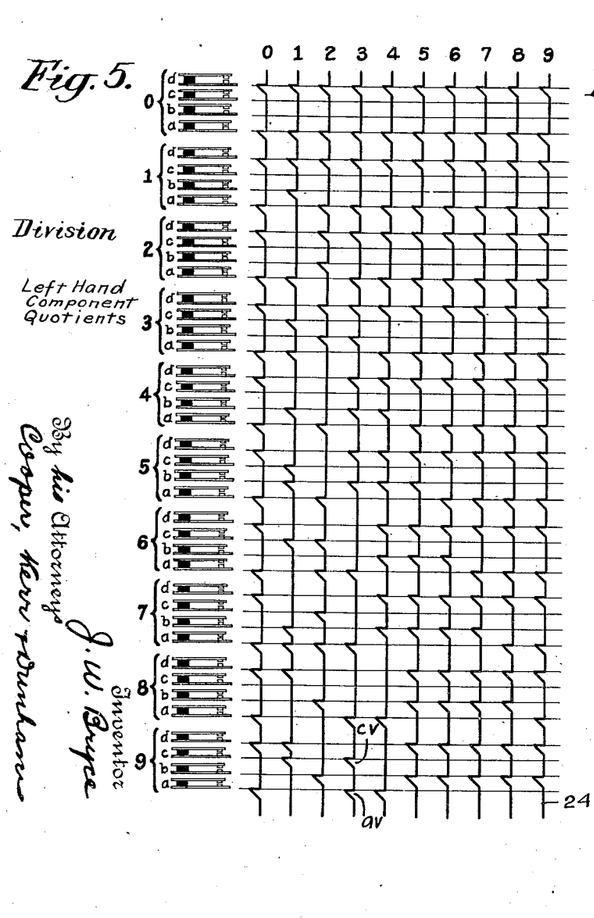
Figure 5A:
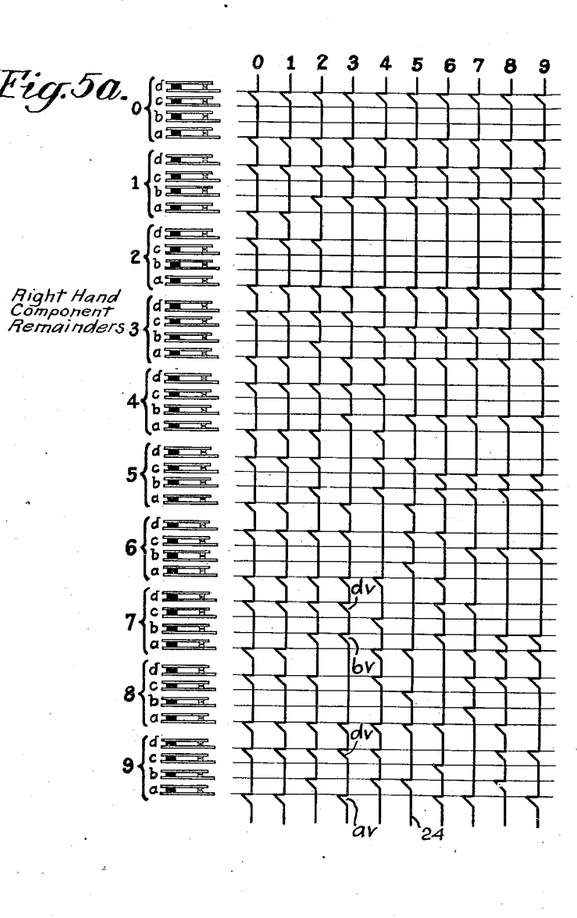

Now referring to Figs. 5 and 5a in effecting division the bars 24 are provided with lugs *v* for division results. If the number 3 bar is actuated (Fig. 5) the lugs *av* and *cv* opposite the symbol 9 to the left are actuated which represents a result of 3 which is 9 divided by 3. With division, in the cases where the divisor does not go equally into the number which is to be divided, provision is made for showing remainders. For this purpose the whole numbers are shown as left hand components (see Fig. 5) and the right hand components are used to represent the remainder whether this be 0 or a number. For example, in dividing 9 by 3 gives a whole number of three and a 0 remainder. Thus the lugs *dv* and *av* on the 3 bar opposite 9 show a remainder of 0. On the other hand if 7 were divided by 3 there would be a remainder of 1 which is represented by the lugs *dv* and *bv* opposite 7 (to the left) on the same 3 bar.

It will thus be seen that the organization of bars just referred to is adapted to set up representations of arithmetical tables by forming combinational representations of the results of the computation. Each setting of any bar effects a concurrent representation of all of the results of a computation involving the digit which the bar stands for taken with all of the other digits. The results, either as sums, differences, products, quotients or remainders—depending upon the setting of the bar by the selecting device 27—are all set up by the vertical lifting of the bars. The combinational representations of results derived from the lug arrangement upon the bars are transferred by the previously described cross bails 31 to contact devices generally designated 32. There are 20 sets of such contacts in the present machine each set comprising four pairs of normally open contacts adapted to be closed by the action of the bails to potentially establish combinational circuits. These contact devices constitute combinational set-up devices.

It will be understood that the particular form of these contact devices is wholly immaterial. They are here shown as of the spring blade type but obviously other forms of circuit controlling devices may be used. It is only necessary that they control circuits in a combinational manner. Obviously the set-up of the combination result representing circuits may be effected with other forms of selective combinational circuit controllers which may have a movement of translation rectilinearly or even have equivalent rotatable movement for effecting a combinational set-up which is to control sets of combinational circuits for representing the results.

A supply line 33 (Figs. 1, 1a and 10) leads to one (the upper) of each of the pairs of contacts and connects to a battery 34 or other source of current which in turn has its opposite side connected to ground. Leading from the other side of the contacts are circuits 35 there being four circuits for each set of four pairs of contacts or 20 sets of four in the machine. The upper set of ten circuits shown on Fig. 1 extend to and are connected to four lines 36, but before reaching these common lines, the circuits pass through individual selectors generally designated 37. Each set of circuits 36 is adapted to be completed through to the common four lines 36 by the closing of the plunger selector switches 37 which are mounted on the corresponding term entering key stems 20. Each key stem has upon it a selector switch means for one of the upper groups or sets of circuits as shown in Fig. 1 and also the same key stem carries a selector means 37 for the proper set of the lower circuits as shown on Fig. 1a. The lower group of circuits 35 after passing the selector devices all connect to four lines 36a which lines are electrically distinct from the similar lines 36 shown on Fig. 1.

The foregoing described selector means associated with the term entering devices 20 are adapted to select those combinational representations of results corresponding to the term entered thereby and discard the others. Thus if the 9 key (20 to the left) were depressed the combinational representation or combinational circuits would be completed only from the lower set of contacts 32 on Figs. 1 and 1a respectively. All other circuits from all the other sets of contacts 32 would be left open and accordingly only the particular electrical combinational representation of the result in its right and left hand components would be controlling upon the upper and lower common lines 36 and 36a.

Result displaying means

The previously described common lines 36 and 36a extend to controlling magnets designated A, B, C and D and A', B', C' and D' and corresponding to the energized lines and closed contacts a, b, c and d. The other side of each of the magnets A, B, C and D and A', B', C' and D' connect to ground as shown at 38 and 38a.

In Fig. 9 there are shown two type sectors 40 and 41 and for printing the left and right hand components of the result. A platen 42 is provided extending over both wheels. The type sectors are both racked by rocking a manual lever 43 which is fixed to a shaft 44 having crank arms 45 fixed thereon which are each spring connected to the type sectors by springs 46. The platen is also tripped and released by a lost motion linkage and latch mechanism 48 which is of a type well known in the recorder art.

Each sector carries a ratchet section 49 and arranged for cooperation with each ratchet are pawls 50 and 51 which are adapted to be thrown into cooperation with the ratchets for differentially arresting the type by the energization of magnets 52 and 53.

By differentially timing the energization of these magnets 52 and 53, the proper type will be arrested at the printing line so as to print upon a suitable record (not shown) upon the completion of the operation of the manual lever.

In order to control the differential energization of the magnets 52 and 53 these magnets are each disposed in local circuits 54 and 55 in Figs. 1 and 1a, each circuit having its own source and being normally open and being adapted to be supplied with current only when upon the energization of a relay 80 or 80a (Figs. 1 and 1a respectively). The magnet coils of these relays are respectively disposed in the common return circuits to ground from magnets A, B, C and D and A', B', C' and D'. The local circuits 54 and 55 are each adapted to be completely closed at the proper differential time in the rocking of the sectors by the following controlling means.

Fixed to each type sector is a commutator 56 and 57 having conducting segments thereon as shown in Figs. 1 and 1a. Cooperating with each commutator are five brushes 58, 59, 60, 61 and 62 and 63, 64, 65, 66 and 67. The brushes are electrically connected in the circuits shown in Figs. 1 and 1a and their connection in the control circuits is controlled by switching means 68, 69, 70 and 71 (Fig. 1) and by 72, 73, 74, and 75 (Fig. 2). These switching devices are respectively controlled by magnets A, B, C and D and A', B', C' and D'.

The operation will be understood by considering a simple example. Suppose 12 is to be printed. Magnet A would be energized to control the printing of the "2" and B' D' would be energized to control the printing of "1". With A energized, relay 80 would be closed, switch members 68, 69 and 70 would be down and member 71 would be up. Then upon the attempted turning of the commutator, current would immediately flow in the local circuit 54, the circuit being completed immediately through brushes 61 and 62 and the conducting segments opposite the numeral 2 in Fig. 1. Magnet 52 would then be energized and the type sector would be arrested with "2" at the printing line ready to print.

The operation would be the same with other combinational representations to control direct readings. For example, with B' D' energized the local circuit 55 would be maintained open (notwithstanding the closure of relay 80a) until the brushes 63 and 64 and 65 and 66 came into cooperation with the two conducting segments opposite (1) in Fig. 1a, at which time the local circuit would be established. With this latter example, switch members 72 and 74 would be up, thus opening the circuit until the aforesaid spots were reached.

The commutators shown provide for controlling all type sector positions for all digits and zero, and the order of the type on the sectors is arranged as indicated to properly coordinate with the commutators in their action. The left hand commutator 57 also controls the minus symbol position in addition to the control of the various digital and zero positions.

It will be understood that either term entering means can be operated first, thus the means designated 20 can be operated first and the other means 23 can be operated subsequently. In this case the device 20 would effect a selection of a pair of sets of lines 35 before any result were set up upon the combinational contacts 32. However, such combinational circuits would be made up upon the entering of the other term of the computation.

It will be obvious that after a result has been printed the restoration of the manual lever 43 will reset the type sectors to home position and restore the commutators to home position. A new computation can then be performed. The selection of the type of computation is effected by the setting device 27 which sets all of the bars 24 so that the proper $t$, $v$, $m$ or $s$ lugs are presented for coaction with the bails.

It is obvious that the present invention is not limited to the particular means for setting up the combinational representations. The herein described arrangement of bars with combinational result representing lugs thereon is merely to be taken as a convenient means for disclosing in a simple manner how combinational result representing circuits may be formed which circuits or sets of circuits are conjointly controlled by the other term means so that the ultimate particular result can be emitted by the machine. Broadly, a plurality of combinational result representing circuits are potentially established, which circuits are selectively completed by the other term entry means.

The term combinational set-up devices is to be considered broadly to denote instrumentalities for effecting a combinational representation of a digit or character in contradistinction to purely digital result representing instrumentalities which employ at least an element for each digit or character to be represented. Applicant's devices, in contradistinction thereto, employ a lesser number of elements, certain of which are set up for controlling action in a combinational manner to represent more characters or digits than the number of the individual elements which are employed to effect such representation.

The term "notation" will be used to designate a group of numbers which have significance as a group, such as 0, 1, 2, 3, 4, 5, 6, 7, 8 and 9, these being the numbers used in the decimal notation. Similarly the groups of numbers 0 to 11 inclusive also comprise a notation, for example the duo-decimal notation. Duo-decimal notation is defined in the Funk & Wagnalls dictionary as "denoting or connected with the system of reckoning by twelves or a notation whose base is 12". Obviously in mathematics there are other notations. While the machine herein described is adaptable for use with any notation, it has been shown and described specifically as employing the decimal notation, which, in the dictionary is defined under "Decimal" as follows—"Decimal arithmetic based upon the use of the Arabic notation, sometimes calculation in decimals" and "the notation of such a system is the ordinary decimal notation of arithmetic".

Certain features of the present application are broadly claimed in my copending application, Serial No. 244,594, filed January 5, 1928.

What I claim is:

1. A computing machine comprising in combination, means comprising devices for receiving amounts which are directly entered thereinto as true numbers which form both of the separate numerical terms to be computed, and means for merging the terms into a computed result, said means comprising converting devices with provision for forming combinational representations of the result upon combination set-up devices.

2. A computing machine with means for entering the separate numerical terms of a to be performed computation thereinto, in combination with means for effecting multiplication, addition subtraction and division of the said terms, said last mentioned means including devices for effecting the required merger of the terms for the desired computation, said merging devices including combinational set-up devices upon which the merged representation may be set up and converted into a combinational representation.

3. The invention set forth in claim 2 in which selecting means are provided for determining the kind of computation which is to be effected upon the entered numerical terms, said selecting means having provisions for controlling the merging means for the forming of different combinational representations according to the kind of computation which is to be effected.

4. A computing machine with means for entering the numerical terms of a to be performed computation thereinto, means under the control of one of the term entry means for forming a representation of a numerical progression which is based upon said entered term, said means including devices for representing said progression upon a plurality of combinational set-up devices, and means under the control of the other term entering means for selecting out from said progression one or more of the terms thereof which are required for the final result which is coordinated to said other term.

5. A computing machine with means for entering the numerical terms of a to be performed computation thereinto, means for effecting the desired computation including devices under the control of one term entering means for forming a plurality of combinational set-ups of possible computations based upon said term, and means controlled by the other term entering means for selecting out from the plurality of set-ups such as set-up or set-ups which is or are coordinated to the result of the computation based upon such other term, the aforesaid means for forming combinational set-ups having provisions for setting up a representation of the numerical terms of the possible result upon a set or sets of elements, each said set of elements consisting of a number of elements which are less in number than the highest possible digital value of a possible numerical term of the result.

6. The invention set forth in claim 5 including the provision of means in the set-up devices for setting up a combinational representation of a remainder when such remainder exists in a dividing operation.

7. A calculating machine including term entry means for entering the terms of a to be performed calculation thereinto, and means for controlling the kind of calculation to be performed by the machine and including in combination, means for setting up combinational representations of a progression which is a table of results based upon the numbers of a particular notation and which progression is also based upon one of the terms as entered by the aforesaid term entering means, and for also setting up said progression in accordance with the kind of computation which is to be performed, and means controlled by other term entering means for selecting out of the plurality of combinational representations which represent the progression a particular result which is coordinated to such other term.

8. A calculating machine including term entering means for entering the terms of a to be performed calculation thereinto, means for controlling the kind of calculation, and including in combination, means controlled conjointly by one term entering means and by the means for controlling the kind of computation for forming a plurality of combinational set-up representations of the results obtainable from said entered term taken in connection with all other factors which might be merged in a calculation therewith, and means controlled by the other term entering means for selecting out a particular combinationally represented result which is coordinated to the other term of the computation.

9. The invention set forth in claim 8 in which a plurality of sets of electric contacts are provided for settting up the combinational representations of the plurality of results.

10. The invention set forth in claim 8 in which a plurality of sets of electric contact combinational set-up devices are provided and in which the read out means comprises means controlled by combinationally energized circuits which are controlled by the aforesaid contacts for setting up the result in readable form.

In testimony whereof I hereto affix my signature.

JAMES W. BRYCE.